United States Patent [19]
Woolridge

[11] 3,743,460
[45] July 3, 1973

[54] ADAPTER FOR COEXTRUSION APPARATUS

[75] Inventor: George Woolridge, Arcola, Ill.

[73] Assignee: National Distillers and Chemical Corporation, New York, N.Y.

[22] Filed: Aug. 9, 1971

[21] Appl. No.: 170,185

[52] U.S. Cl............... 425/131, 137/599.1, 137/604, 137/625.32
[51] Int. Cl............................................. B29f 3/02
[58] Field of Search............ 137/599.1, 604, 625.32, 137/625.47; 425/130, 131

[56] References Cited
UNITED STATES PATENTS

| 3,546,739 | 12/1970 | Callahan et al..................... 425/131 |
| 3,464,087 | 9/1969 | Koch................................... 425/131 |
| 3,098,506 | 7/1963 | Spragens..................... 137/625.47 X |

Primary Examiner—Robert G. Nilson
Attorney—Allen A. Meyer, Jr.

[57] ABSTRACT

An extrusion die for the production of multi-layer flat films of thermoplastic sheet material wherein the die is selectively adjustable to change from a three-layer laminated film to a two-layer laminated film and, where a two-layer film is being extruded, to reverse the arrangement of the layers.

9 Claims, 9 Drawing Figures

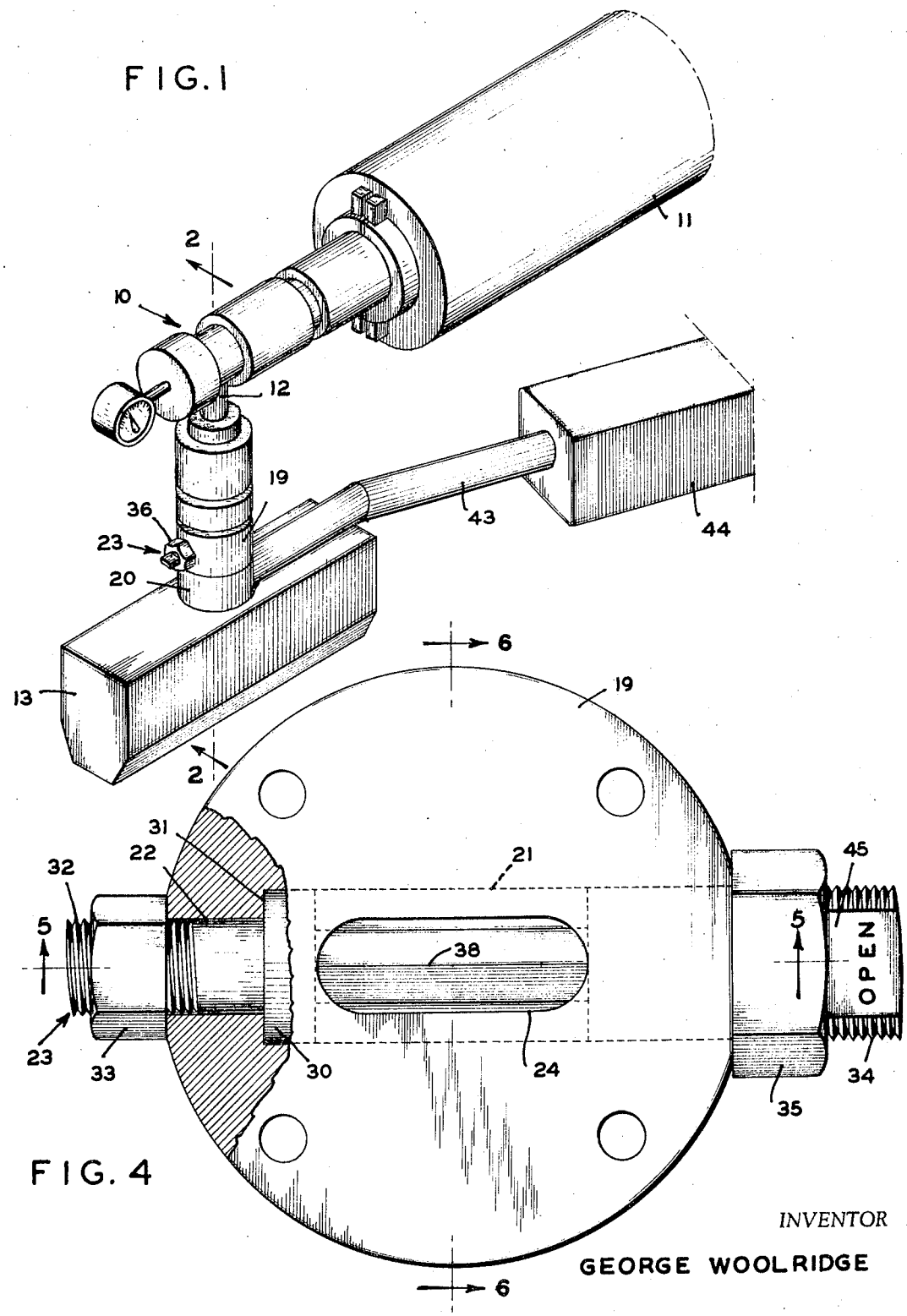

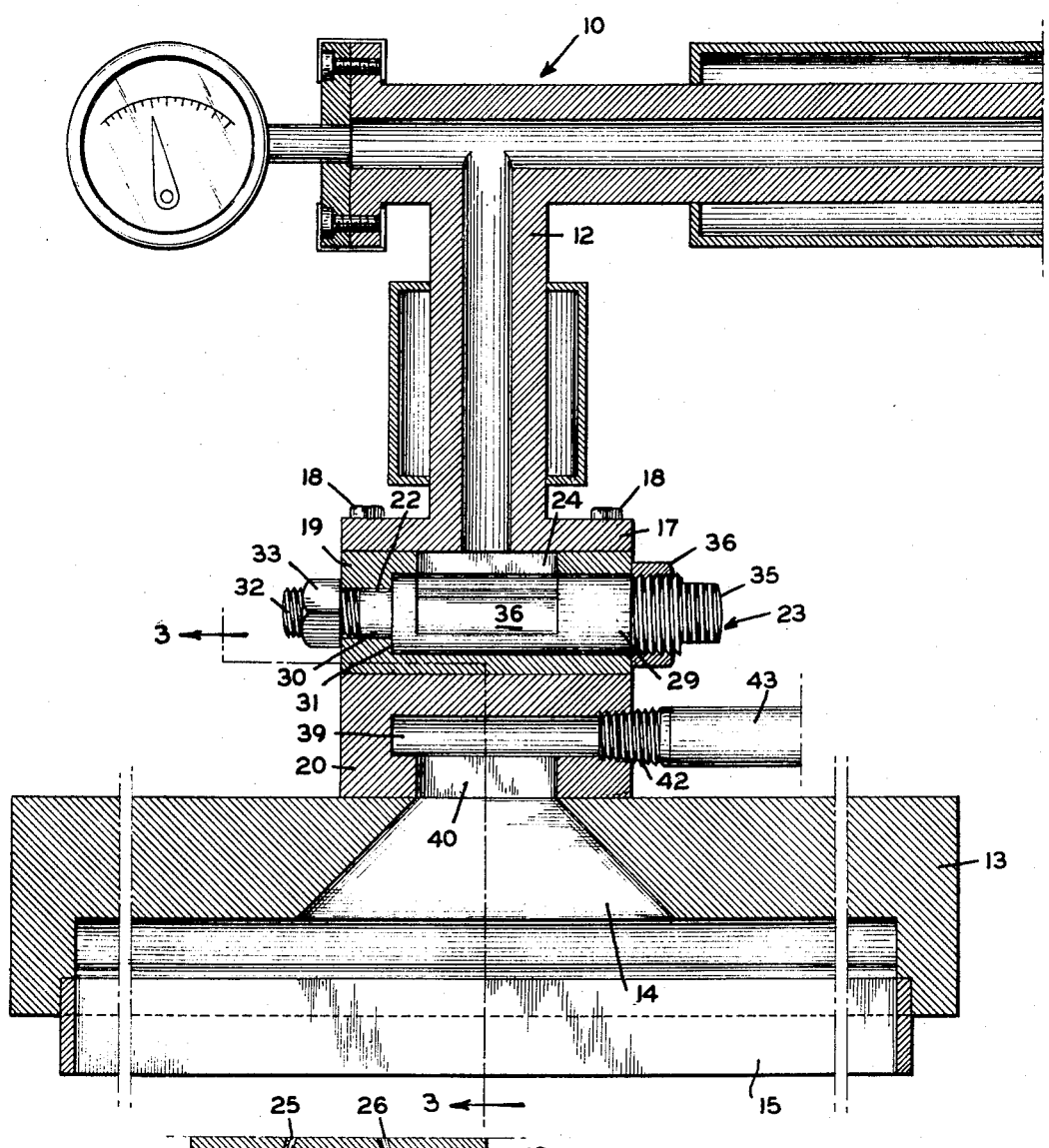

INVENTOR
GEORGE WOOLRIDGE

BY Allen A. Meyer, Jr.
ATTORNEY

INVENTOR
GEORGE WOOLRIDGE

BY *Allen A. Meyer, Jr.*
ATTORNEY

ADAPTER FOR COEXTRUSION APPARATUS

This invention relates to the laminar extrusion of multi-layer flat sheets of similar or dissimilar thermoplastic resins from a single die. Methods and apparatus of this character, where a single die is provided with similar or dissimilar thermoplastic resins from different sources, are well known in this art, and three-layer films where a sheet of thermoplastic resin from one source is sandwiched between two sheets or layers of thermoplastic resin from another source also are well known.

Extrusion dies where two-layer film may be extruded also are well known and present commercial practices provide coextrusion die structures which include devices or adapters whereby three-layer or two-layer films (or other multiple layer films) may be produced as desired. It will be understood that selective utilization of these adapters requires that the apparatus be shut down and that one adapter be substituted for another when a change in the number of layers is desired. This is a costly and time-consuming operation which requires the complete shutting down and cooling of the apparatus before the one adapter can be removed and another substituted.

Accordingly, it is the major purpose of the present invention to provide a novel adapter for extrusion apparatus of the character with which we here are concerned whereby a conversion from a two-layer film to a three-layer film, or reversely, may be accomplished with particular ease and convenience and without any necessity for the removal of the adapter or the installation of any additional parts or equipment.

It is a further object of the invention to provide a novel adapter for extrusion apparatus of the character with which we here are concerned whereby a two-layer film may be produced from thermoplastic resins provided from different sources, and the disposition of the two layers may be reversed with particular convenience without any necessity for removal or structural change in the adapter. This is of particular importance where a two-layer film is being produced for coating, as through a direct casting operation, upon a substrate.

Further objects and advantages of the invention will be readily apparent from the following Specification taken in conjunction with the accompanying drawings wherein:

FIG. 1 is a fragmentary perspective view illustrating, somewhat diagramatically commercial extrusion apparatus with the novel adapter of the present invention mounted therein;

FIG. 2 is a vertical sectional view of the apparatus of FIG. 1, taken on the line 2 — 2 thereof, looking in the direction of the arrows;

FIG. 3 is a detail sectional view through the extrusion die and the lower portion of the present adapter, taken on the line 3 — 3 of FIG. 2 looking in the direction of the arrows;

FIG. 4 is a top plan view of the novel adapter of the present invention, partially in section for purposes of clarity;

Figure 6:
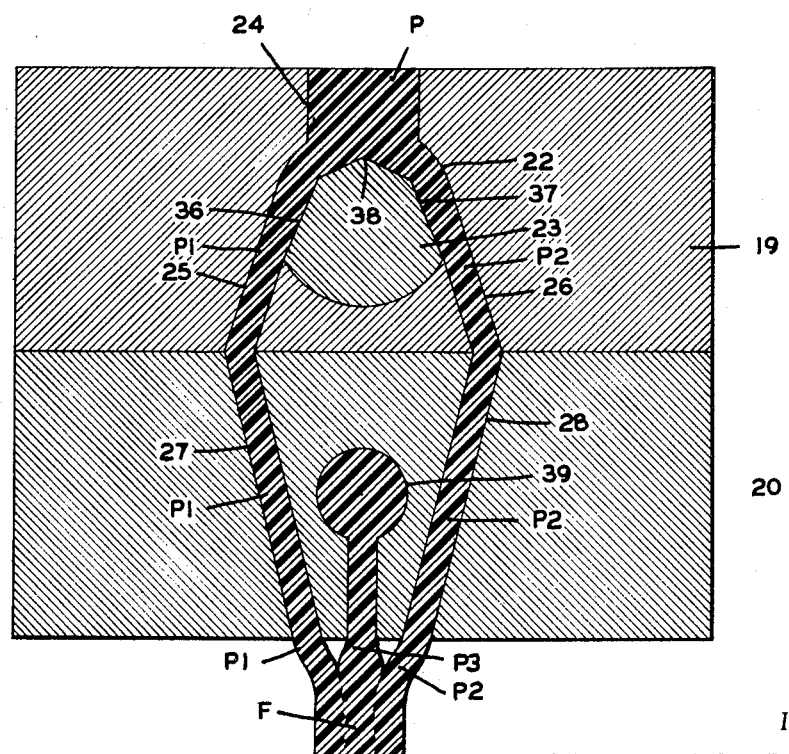
FIG. 6 is a vertical sectional view through the adapter of the present invention, taken on the line 6 — 6 of FIG. 4 looking in the direction of the arrows.
Figure 7:
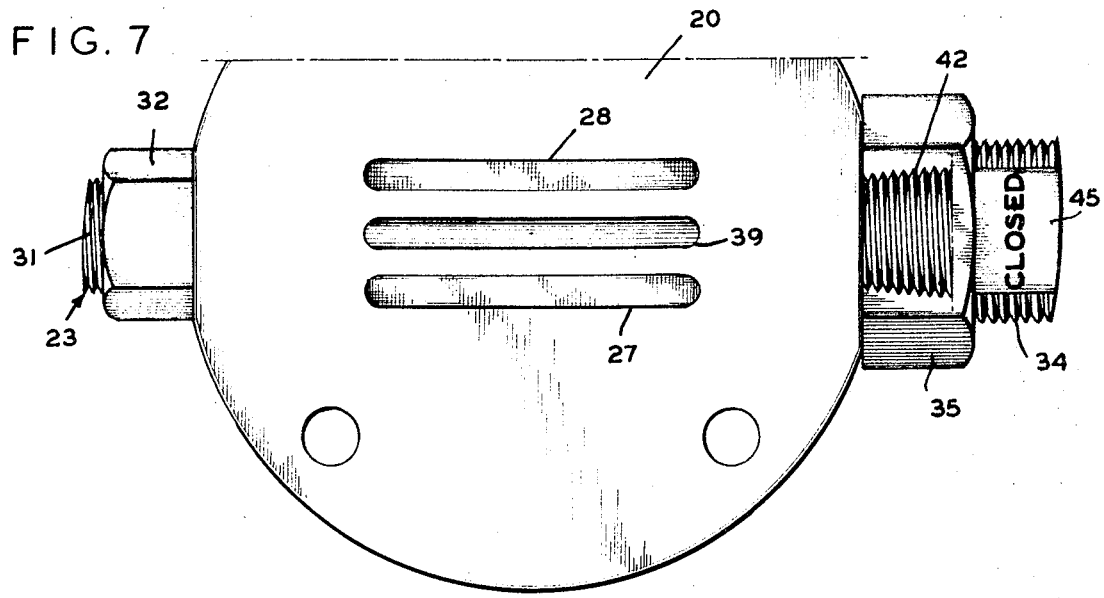
FIG. 7 is a fragmentary top plan view of the lower portion of the adapter.
Figure 8:
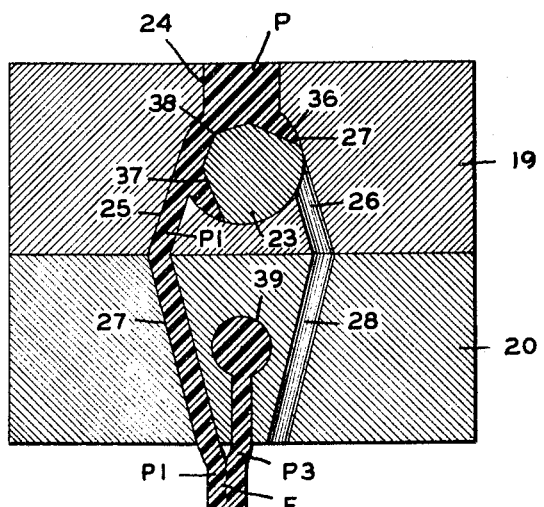
Figure 9:
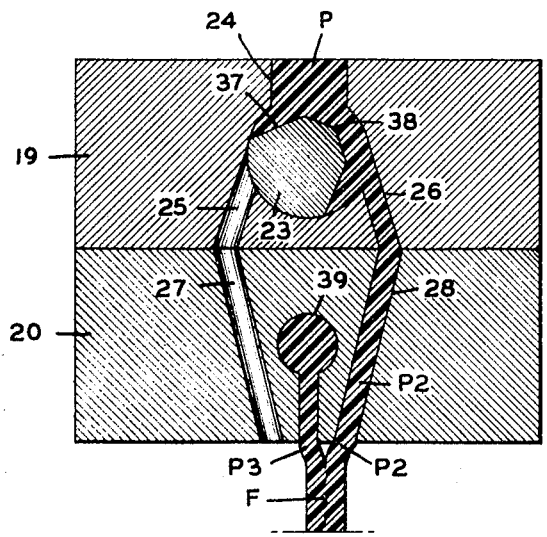

FIG. 8 is a vertical sectional view through the adapter, similar to FIG. 6 and on a slightly reduced scale, illustrating the adapter after adjustment thereof to produce a two-layer film as distinguished from the three-layer film of FIG. 8; and FIG. 9 is a vertical sectional view similar to FIG. 8 and illustrating the adapter in adjusted position for reversal of the disposition of the layers of a two-layer film.

As shown in the drawings, particular reference being had to FIGS. 1, 2, and 3 thereof, conventional extrusion apparatus indicated generally at 10 is provided for delivering a heat-plasticized stream of thermoplastic resin from a first extruder 11 to the inlet conduit 12 of a die 13. The die is provided with an interior cavity or manifold 14 and includes a pair of spaced lips 15 which define an elongated and narrow discharge orifice 16. Desirably, as is well known in the art, the die lips may be adjustable so as to vary, within reasonable limits, the gauge of the laminated film (flat sheet material) being produced.

In conventional extrusion apparatus the inlet conduit 12 will communicate directly with the die at a point remote from the die orifice. The present invention contemplates the insertion or mounting of an adapter between the discharge orifice of the inlet conduit and the die body and, to this end, the lower extremity of the inlet conduit 12 is provided with an outwardly directed flange 17 and suitable fastening means such as bolts 18 or the like are provided for securing the inlet conduit, inserted adapter, and die body 13 in assembled relationship.

Figure 5:
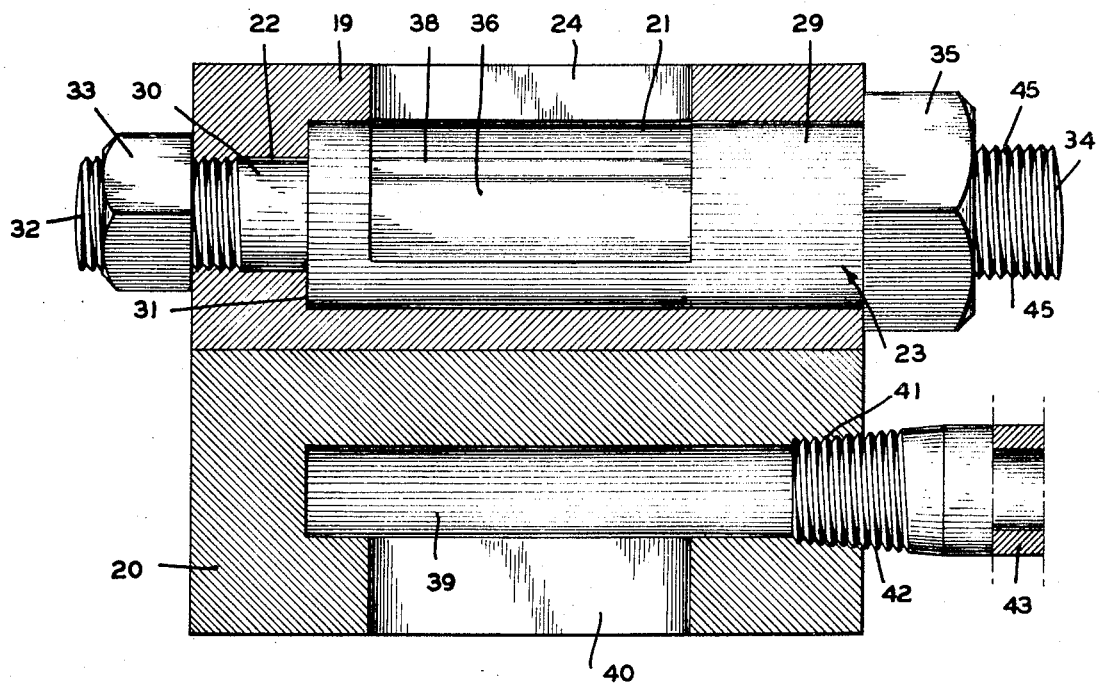
FIG. 5 is a horizontal sectional view through the adapter taken on the line 5 — 5 of FIG. 4 looking in the direction of the arrows.

The novel adapter of the present invention is constituted by upper and lower mating sections 19 and 20, respectively. As shown more particularly in FIGS. 4, 5, and 6 of the drawings, each of the adapter sections or bodies may be substantially cylindrical and the upper adapter body or portion 19 is provided with a transversely disposed machined bore 21 which communicates with an axially aligned machined bore 22, preferably of lesser diameter, thus providing a passageway through the body 19 for the reception of a plug valve 23 which will be described more fully hereafter. The upper surface of the adapter body 19 is provided with a vertically disposed aperture or passageway 24 communicating with the transverse bore 21 intermediate the extremities thereof and permitting direct entry into the adapter assembly, through the inlet conduit 12, of plasticized resin from the first extruder source 11.

The adapter body portion 19 is provided with a pair of downwardly extending and diverging passageways 25 and 26, the length of each of such passageways being identical to the length of the passageway 24. As shown more particularly in FIGS. 6, 8, and 9 of the drawings, this pair of diverging passageways provides two paths for movement of the heat-plasticized stream of thermoplastic resin from the first extruder 11 directly through the upper adapter body 19. Further, the diverging passageways 25 and 26 communicate directly with a complementary pair of converging passageways 27 and 28 of identical dimensions which extend through the lower adapter body 20 and provide a direct passageway for the stream of resin through the mating adapter portions and into the manifold 14 of the die 13.

The plug valve 23, which is received within the machined bore 21 of the upper adapter body 19, includes an inner elongated machined portion 29 having a snug rotative fit within the bore 21 and an outer machined portion 30 of reduced diameter having similar snug rotative fit within the axially aligned bore 22 of the upper adapter body portion, the shoulder 31 serving to position the plug valve and limit the entry thereof into the upper adapter body.

The extremity of the reduced portion 30 of the plug valve is externally threaded as indicated at 31 for the reception of the locking nut 32. Similarly, the opposed extremity of the plug valve is externally threaded as indicated at 34 for the reception of the locking nut 35. With the plug valve 23 positioned within the upper adapter body 21, and the locking nuts 33 and 35 tightened, any possibility of inadvertent rotative movement of the plug valve will be precluded.

To permit the splitting of the flow of thermoplastic material from the first extruder 11 into two streams and the passage of these streams around the plug valve 23 and into the diverging passageways 25 and 26, the portion 29 of the plug valve is machined, intermediate the extremities thereof and in direct vertical alignment with the passageway 24 and extending the full length thereof, so as to provide a cut-away portion constituted by two inclined surfaces 36 and 37 having an angular relationship to the vertical axis of the plug valve identical and complementary to that of the passageways 25 and 26. This is illustrated more particularly in FIG. 6 of the drawings where it is disclosed that, preferably, the upper surface of the machined portion of the plug valve is provided with a torpedo-like tapered apex 38 to assist in splitting the flow of thermoplastic material and avoiding undue turbulence and adverse frictional influences.

The lower adapter body portion 20 is provided with a centrally located and horizontally disposed bore 39 extending thereinto a distance substantially identical to the length of the bore 21 at the upper adapter body portion, and a passageway 40 provides communication between this bore and the bottom surface of the lower adapter body portion. It will be noted that the bore 39 is located in direct vertical alignment with the bore 21 of the upper adapter body portion 19 and is of a length identical thereto. The free extremity of the bore 39 is internally threaded as indicated at 41 for the reception of the externally threaded extremity 42 of an inlet conduit 43 which communicates directly with a second extruder 44. A heat-plasticized stream of thermoplastic resin from the second extruder 44 will flow directly through the inlet conduit 43 into the bore 39 of the lower adapter body and downwardly through the passageway 40 into the manifold 14 of the die 13.

As stated hereabove, the lower adapter body portion 20 is provided with downwardly converging passageways 27 and 28 which extend thereinto and are in communication with the passageways 25 and 26 which extend through the upper adapter body 19. Thus, with heat-plasticized thermoplastic material being supplied simultaneously from the first and second extruder sources 11 and 44, respectively, the flow of material P from the first source will split into two streams P1 and P2 and pass directly through the upper and lower mating adapter body portions. Simultaneously, the flow of thermoplastic material P3 from the second extruder source will pass into the bore 39 of a lower adapter body and thence downwardly through the passageway 40 and between the two streams of resin flowing from the first extruder.

This is illustrated with particular clarity in FIG. 6 of the drawings and it will be understood that these three streams are in a highly viscous condition and unite to produce a three-layer product which enters immediately into the die manifold 14 and then moves in laminar extrusion through the die and toward the die orifice. During such movement the three-layer film is reduced in thickness and extended laterally to the full width of the elongated discharge die orifice 16 and emerges therefrom as a film in flat sheet form having a predetermined gauge or thickness in accordance with die orifice dimensions.

During laminar extrusion each of the three layers is proportionately reduced in thickness and while a unitary end product F is obtained, each of the three layers preserves its individual characteristics. Thus, where a sheet or layer of thermoplastic resin of one character is being sandwiched between layers having differing characteristics, this permits the utilization, as the external surfaces, of a resin such as polyethylene known to have excellent heat-sealing characteristics and an inner layer from a material such a polypropylene known to have superior resistance to impact but with lesser heat-sealing capabilities than polyethylene.

To convert the adapter for the production of a two-layer film as distinguished from a three-layer film, all that is necessary is to make slight rotative adjustment of the plug valve 23. To this end, the threaded extremity 34 of the plug valve is provided with flattened upper and lower surfaces 45 which may, if desired, include, respectively, such indicia as "Closed" and "Open." With the loosening of the nuts 33 and 35 and rotative adjustment of the plug valve 23 to the position shown in FIG. 8, the right hand combined passageway 26 and 28 will be closed and thermoplastic material from the first extruder source will flow only through the combined passageway 25 and 27 on the left hand side of the fluid material from the second extruder source flowing through a central passageway 40 in the lower extruder body. This is clearly shown in FIG. 8 of the drawings as distinguished from the three-layer assembly and product illustrated in FIG. 6. Where it is desired to reverse the arrangement of a two-layer film, all that is necessary is to loosen the locking nuts on the plug valve and rotate the valve in the opposite direction to the position shown in FIG. 9 of the drawings. Here the combined passageway 25 and 27 is plugged or closed and flow from the first extruder source through the combined passageway 26 and 28 is on the right hand side of material from the second extruder source exiting through the central passageway 40 in the lower adapter body portion 20.

It also is contemplated that the device will function with equal facility to produce a single-layer film where the plug valve is adjusted to the neutral position illustrated in FIG. 6 of the drawings and only the first extruder source is in operation. In this arrangement, two streams of heat-plasticized thermoplastic resin exiting through the passageways 27 and 28 directly into the manifold 14 of the die will be extruded therefrom as one layer of film without any material change having been occasioned therein by reason of passage around the diverter or plug valve 23.

There has thus been described a novel adapter assembly for use in connection with extrusion apparatus of the character with which we here are concerned whereby two and three-layered films of any desired gauge may be produced selectively from similar or dissimilar thermoplastic resins with particular facility and without any requirement for either the removal or structural change of the adapter assembly when change from one type of layered film to the other is required. Additionally, in connection with the production of two-layer film, the arrangement or disposition of the layers may be reversed with equal facility. It also is contemplated that with modification of the angularity of the divergent passageways from the first or upper adapter body, one or more additional similar adapter bodies may be included, each fed from an additional source of thermoplastic resin, and films including greater numbers of layers may be extruded laminarly from conventional extrusion apparatus and die structures.

It will be obvious to those skilled in this art that various changes may be made in the invention without departing from the spirit and scope thereof and thus the invention is not considered limited by that which is shown in the drawings and described in the specification and reference therefore is had to the claims for summaries of the essentials of the invention, and of the novel features of construction, and novel combination of parts, for all of which protection is desired.

What is claimed is:

1. An extrusion adapter suitable for insertion between at least two sources of supply of heat plasticized synthetic resinous material and a die for the coextrusion of a flat sheet of multiple layered thermoplastic film, said adapter including a body portion provided with a substantially centrally located passageway extending into one surface thereof and communicating with a pair of spaced passageways extending through said body to the opposite surface thereof, said body also being provided with a first transverse bore located on a plane in direct alignment with the point of juncture of said centrally located passageway and said pair of spaced passagways, a plug valve located within said transverse bore for rotative movement and adjustable to permit thermoplastic resin entering said substantially centrally located passageway from a first source of supply to flow selectively through at least one of said pair of spaced passageways as separate streams, said body being further provided with a second transverse bore located on a plane beneath that of said first bore and in axial alignment therewith, and a passageway providing communication between said second transverse bore and said opposite surface of said body intermediate said pair of spaced passageways to permit thermoplastic resin entering said second transverse bore from a second source of supply to flow through said body as a stream immediately adjacent to a stream of resin from said first source of supply flowing through either one of said pair of spaced passageways.

2. An extrusion adapter suitable for insertion between at least two sources of supply of heat plasticized synthetic resinous material and a die for the coextrusion of a flat sheet of multiple layered thermoplastic film, said adapter including mating upper and lower body portions, said upper adapter body portion being provided with a transverse bore and having a substantially centrally located passageway in the top surface of said upper adapter body portion communicating with said transverse bore, said upper body portion also being provided with a pair of spaced downwardly directed passageways extending from said transverse bore through the bottom surface of said upper adapter body portion, a pair of complementarily spaced downwardly directed passageways extending through said lower adapter body portion in direct communication with the pair of spaced passageways in the upper adapter body portion, a plug valve mounted within said transverse bore for rotative movement and adjustable to permit thermoplastic resin entering said substantially centrally located passageway from a first source of supply of flow selectively through at least one of said aligned pairs of downwardly directed spaced passageways, a centrally located cavity in said lower adapter body portion and a substantially centrally located passageway in the bottom surface of said lower adapter body portion intermediate the pair of spaced passageways therein and communicating with said centrally located passageway to permit thermoplastic resin from a second source of supply to flow through said lower adapter body portion as a stream immediately adjacent to a stream of resin from said first source of supply flowing through either one of said aligned pair of spaced passageways.

3. An extrusion adapter as set forth in claim 2 where the pair of spaced downwardly directed passageways in the upper adapter body are divergingly disposed and the complementary pair of spaced passageways in the lower adapter body which communicate therewith are convergingly disposed.

4. An extrusion adapter as set forth in claim 2 where the transversely disposed bore in the upper adapter body which communicates with the vertically disposed passageway therein is of greater length than said vertically disposed passageway and constitutes a valve seat for said plug valve, and where said plug valve is provided with a cut-away portion located in alignment with said vertically disposed passageway and extending substantially the full length thereof, said cut-away portion comprising a pair of upwardly inclined side surfaces and a pair of upwardly inclined top surfaces constituting a tapered apex.

5. An extrusion adapter as set forth in claim 4 including means for selectively rotating said plug valve from a central position, where a stream of resin entering the vertically disposed passageway in the upper extruder body may flow through both aligned pairs of downwardly directed passageways, to one of two adjusted positions where flow of said resin will be restricted to one of said aligned pairs of downwardly directed passageways.

6. An extrusion adapter as set forth in claim 5 where the extremities of said plug valve are externally threaded for engagement with locking means for retaining said plug valve in adjusted position and where one of said threaded extremities is provided with opposed flattened surfaces to permit ready rotative adjustment of said plug valve.

7. Extrusion apparatus for the coextrusion of a flat sheet of multiple layered thermoplastic film, said apparatus including a first extruder and a die provided with an interior manifold and an elongated and narrow discharge orifice; conduit means for delivering a heat plasticized stream of thermoplastic resin from said first extruder to said die manifold; an adapter mounted in said conduit means, said adapter including mating upper and lower body portions; said upper adapter body being provided with a transverse bore and having a substantially centrally located passageway in the top surface thereof communicating with said transverse bore, said upper body portion also being provided with a pair of spaced downwardly directed passageways extending from said transverse bore through the bottom surface of the upper adapter body; a pair of complementarily spaced downwardly directed passageways extending through the lower adapter body in direct communication with the pair of passageways in the upper adapter body; a plug valve mounted within said transverse bore for rotative movement and adjustable to permit heat plasticized resin from said first extruder to flow selectively through at least one of said aligned pairs of spaced passageways into the die manifold; a centrally located cavity in said lower adapter body and a substantially centrally located passageway in the bottom surface of the lower adapter body intermediate the pair of spaced passageways therein providing communication between said centrally located cavity and the die manifold; a second extruder; and conduit means connecting said second extruder with said centrally located cavity to permit heat plasticized resin from said second extruder to flow through the centrally located passageway in the lower die body into the die manifold as a stream immediately adjacent to a stream of resin from the first extruder flowing through either one of said aligned pair of spaced passageways.

8. Extrusion apparatus as set forth in claim 7 where the transversely disposed bore in the upper adapter body which communicates with the vertically disposed passageway therein is of greater length than said vertically disposed passageway and constitutes a valve seat for said plug valve, and where said plug valve is provided with a cut-away portion located in alignment with said vertically disposed passageway and extending substantially the full length thereof, said cut-away portion comprising a pair of upwardly inclined side surfaces and a pair of upwardly inclined top surfaces constituting a tapered apex.

9. Extrusion apparatus as set forth in claim 8 including means for selectively rotating said plug valve from a central position, where a stream of resin entering the vertically disposed passageway in the upper extruder body may flow through both aligned pairs of downwardly directed passageways, to one of two adjusted positions where flow of said resin will be restricted to one of said aligned pairs of downwardly directed passageways.

* * * * *